United States Patent [19]

Iizuka

[11] Patent Number: 4,939,827
[45] Date of Patent: Jul. 10, 1990

[54] METHOD OF MANUFACTURING A BEARING DEVICE INCLUDING A HOUSING WITH A FLANGE AT ONE END THEREOF AND A BEARING BUSH PRESS-FITTED THEREINTO

[75] Inventor: Akihiro Iizuka, Nagoya, Japan

[73] Assignee: Diado Metal Company Ltd., Nagoya, Japan

[21] Appl. No.: 251,352

[22] Filed: Sep. 26, 1988

[30] Foreign Application Priority Data

Oct. 20, 1987 [JP] Japan ................... 62-262706

[51] Int. Cl.$^5$ .................. B21D 53/10; B23P 19/04
[52] U.S. Cl. ..................... 29/898.054; 29/515; 29/525; 384/271
[58] Field of Search .............. 29/149.5 R, 149.52, 29/149.53, 149.5 DP, 525, 514, 515, 516; 384/271, 297, 907; 16/273, 381

[56] References Cited

U.S. PATENT DOCUMENTS

| | | | |
|---|---|---|---|
| 714,950 | 2/1902 | Richards | 384/271 |
| 1,093,290 | 4/1914 | Pender | 384/271 X |
| 2,732,267 | 1/1956 | Stover | 384/271 |
| 3,319,098 | 5/1967 | Hartman | 384/271 X |
| 3,762,881 | 10/1973 | Dunn | 29/525 X |
| 3,899,912 | 8/1975 | Orain | 29/149.5 DP X |
| 3,953,089 | 4/1976 | Dainin | 384/291 |
| 4,774,749 | 10/1988 | Furumura | 29/149.5 C X |

FOREIGN PATENT DOCUMENTS

| | | | |
|---|---|---|---|
| 33710 | 12/1949 | Poland | 384/271 |
| 941729 | 7/1982 | U.S.S.R. | 384/271 |

*Primary Examiner*—Timothy V. Eley
*Assistant Examiner*—Peter Vo
*Attorney, Agent, or Firm*—Browdy and Neimark

[57] ABSTRACT

A method of manufacturing a bearing device having a housing into which a bearing bush is press-fitted. This method includes forming a tapered shape of a bearing hole of a bearing bush, and press-fitting the bearing bush into a bore of the housing having a uniform inside diameter.

3 Claims, 2 Drawing Sheets

METHOD OF MANUFACTURING A BEARING DEVICE INCLUDING A HOUSING WITH A FLANGE AT ONE END THEREOF AND A BEARING BUSH PRESS-FITTED THEREINTO

BACKGROUND OF THE INVENTION

This invention relates to a method of manufacturing a bearing device including a housing with a flange at one end thereof and a bearing bush press-fitted thereinto.

Also, in a conventional process of manufacturing a bearing device by press-fitting a bearing bush having a certain inside diameter into a bore of a housing with a flange having a certain inside diameter, the bearing hole of a bearing device thereby formed tends to be tapered. More specifically, as the housing includes a cylindrical portion and a flanged portion, the cylindrical portion having a smaller wall thickness than that of the flanged portion, the cylindrical portion will expand more than the flanged portion upon the press-fitting of a bearing bush into the bore of the housing with the result that in a press-fitted state the inner bore of the bearing bush becomes tapered toward the flanged portion of the housing from the cylindrical portion thereof.

If a conventional bearing having a tapered bearing hole is assembled in an actual machine, an undesirable state such as wear due to non-uniform contact between the inner surface of the hole and the rotary shaft. To avoid this problem, it is necessary to adjust the inner surface of the hole by machining or the like to make the inside diameter of the bearing hole uniform. This is one of the causes of an increase in the manufacturing cost.

SUMMARY OF THE INVENTION

It is an object of the present invention to solve these problems of the conventional techniques.

To this end, the present invention provides a method of manufacturing a bearing device, comprising the steps of forming a bearing bush to have an inner bore thereof tapered, providing a housing having a flange at one end thereof and a bore of a uniform inner diameter and press-fitting said bearing bush into the bore of said housing toward the side of the flange of said housing from the side of a non-flanged portion of the housing.

BRIEF DESCRIPTION OF THE DRAWINGS

FIG. 3a is a diagram of process of press-fitting.

DESCRIPTION OF THE PREFERRED EMBODIMENTS

Figure 1:
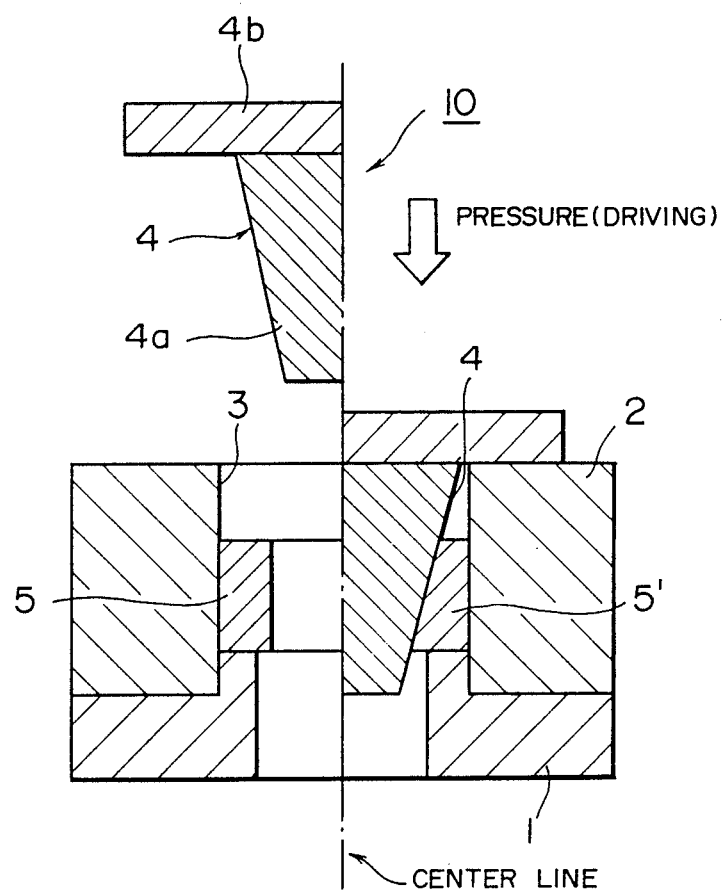
FIG. 1 is a cross-sectional view of essential portions of an apparatus for manufacturing a bearing bush having a tapered hole.

FIG. 1 shows an apparatus 10 for manufacturing a bearing bush used to carry out a bearing manufacturing method in accordance with the present invention. The manufacturing apparatus 10 has a stopper 1, a die 2 disposed above the stopper 1, and a core bar 4. The core bar 4 has a main body 4a in the form of a frustum, and a support 4b to which this main body is fixed.

Figure 2A:
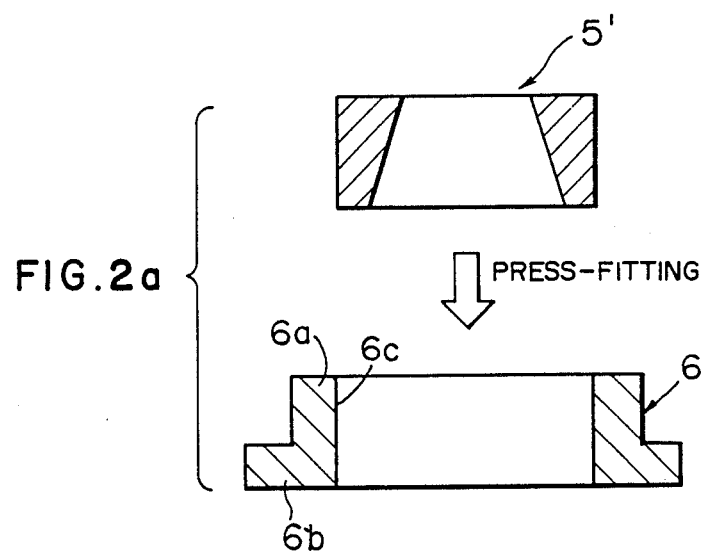
FIG. 2a is a diagram of a process of press-fitting the bearing bush into a housing; having a flange at one end thereof.
Figure 2B:
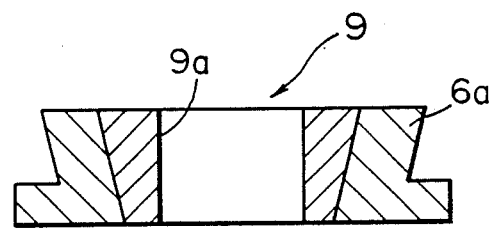
FIG. 2b is a cross-sectional view of a bearing device having a flange.

This manufacturing apparatus operates as described below. A bearing bush blank 5 is inserted into a bore 3 of the die 2 and is placed on the stopper 1. The bearing bush blank 5 is in the form of a cylinder having certain uniform inside and outside diameters. The core bar 4 is then driven into the bore 3 of the die 2, thereby forming a bearing bush 5' having a tapered bearing hole. As shown in FIG. 2a, the bearing bush 5' thereby formed is press-fitted into a housing 6 which has a bore 6c of a uniform inner diameter and a flange at one end thereof. As a result, a bearing device 9 having a non-tapered bearing hole 9a is formed by virtue of compression effect. As shown in FIG. 2b, the bearing hole 9a of the bearing device 9 7 has a uniform inside diameter, and a cylindrical portion 6a of the outer housing of the bearing device 9 has a uniform thickness but it is in the form of a tapered ring. More specifically, as the housing 6 includes a cylindrical portion 6a and a flanged portion 6b, the cylindrical portion 6a having a smaller wall thickness than that of the flanged portion 6b, the cylindrical portion 6a will expand more than the flanged portion 6b upon the press-fitting of the bearing bush 5' into the bore 6c of the housing 6 with the result that in a press-fitted state the inner bore of the bearing bush 5' becomes straight to have a uniform inner diameter. The inner bore of the bearing bush 5' is correspondingly tapered when test pieces are used to determine an amount of deformation upon the press-fitting.

FIG. 3a shows a case where the bearing bush 5' having a tapered bearing hole is press-fitted into a housing 8 having a flange. A bearing device 9 thereby formed has a uniform inside diameter by virtue of the compression effect.

In accordance with the present invention, the bearing hole of the bearing bush is preliminarily tapered so that a bearing device having a non-tapered bearing hole is formed by virtue of the compression effect as the thus-prepared bearing bush is press-fitted into the housing, thus realizing a desired bearing device.

What is claimed is:

1. A method of manufacturing a bearing device, comprising the steps of:
   forming a bearing bush having an inner bearing bore thereof tapered;
   providing a housing having a flange at one end thereof and having a bore of a uniform inner diameter; and
   press-fitting said bearing bush into the bore of said housing toward the side of the flange of said housing from the side of a non-flanged portion of the housing wherein the taper of said tapered bearing bore is selected such that, after said press-fitting step, said tapered bearing bore has an essentially uniform diameter.

2. The method of claim 1, further comprising, prior to said press fitting, forming said bearing bush having said tapered bearing bore from a cylindrical bearing bush blank.

3. The method of claim 1, wherein said housing has a flange at an end opposite from an end through which said bearing bush is pressed during said press-fitting.

* * * * *